(No Model.) 7 Sheets—Sheet 2.
J. C. McBEAN, G. J. McLAUGHLIN, H. R. CORKHILL, Jr. & G. BAXTER.
LABELING MACHINE.
No. 502,311. Patented Aug. 1, 1893.
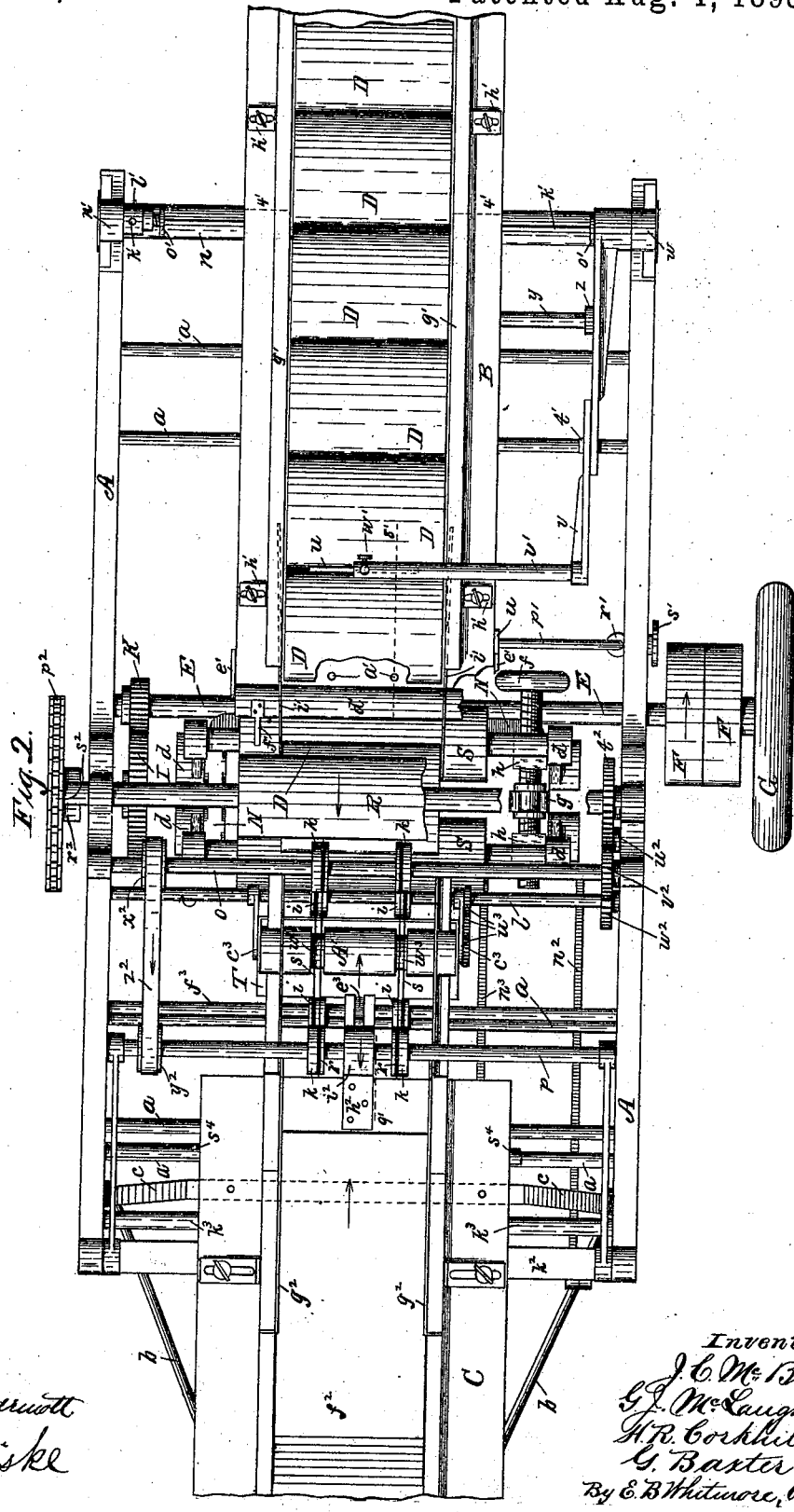
Attest:
M. L. McDermott
E. B. Fiske
Inventors:
J. C. McBean,
G. J. McLaughlin
H. R. Corkhill, Jr.
G. Baxter,
By E. B. Whitmore, Atty.

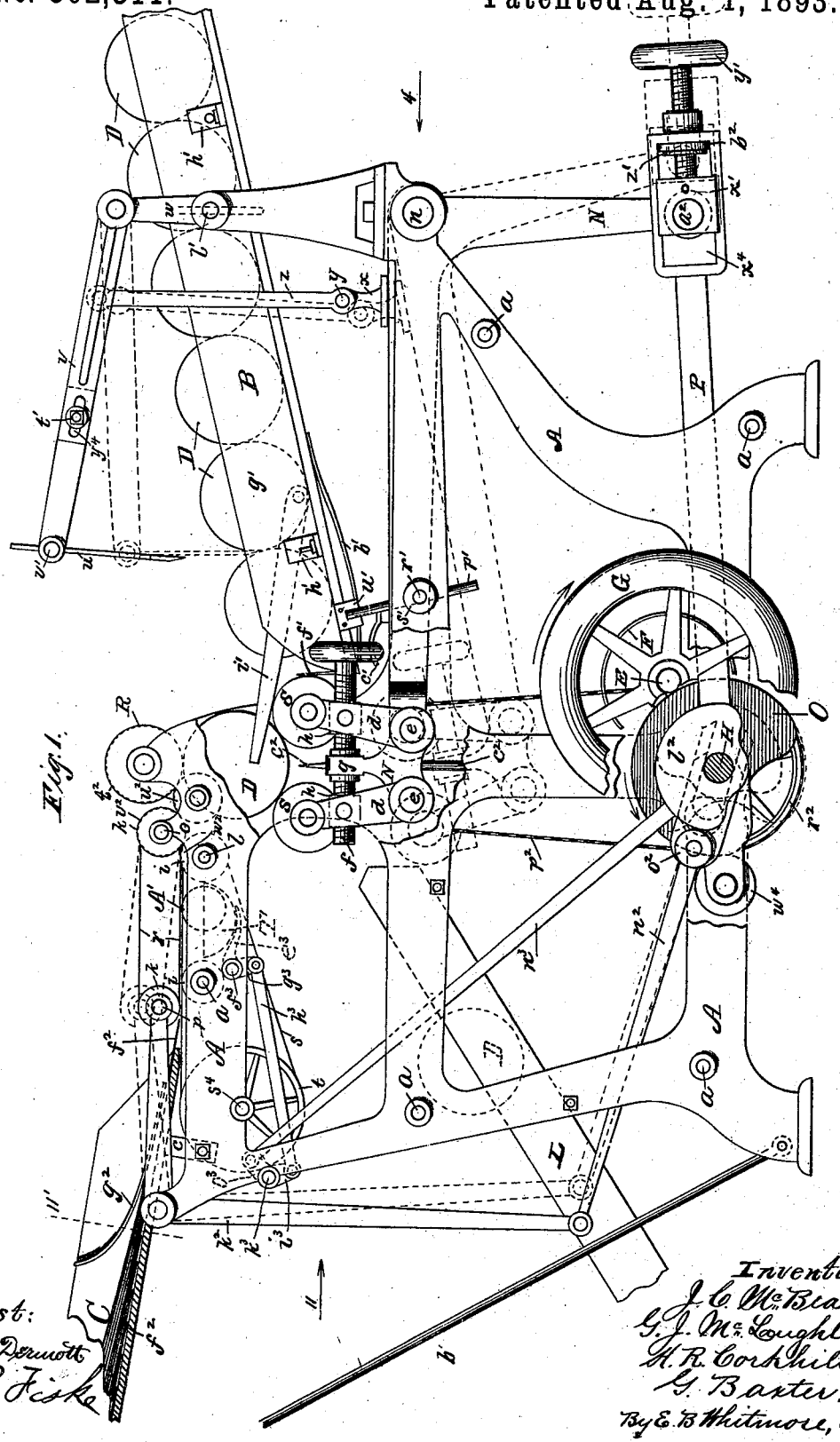

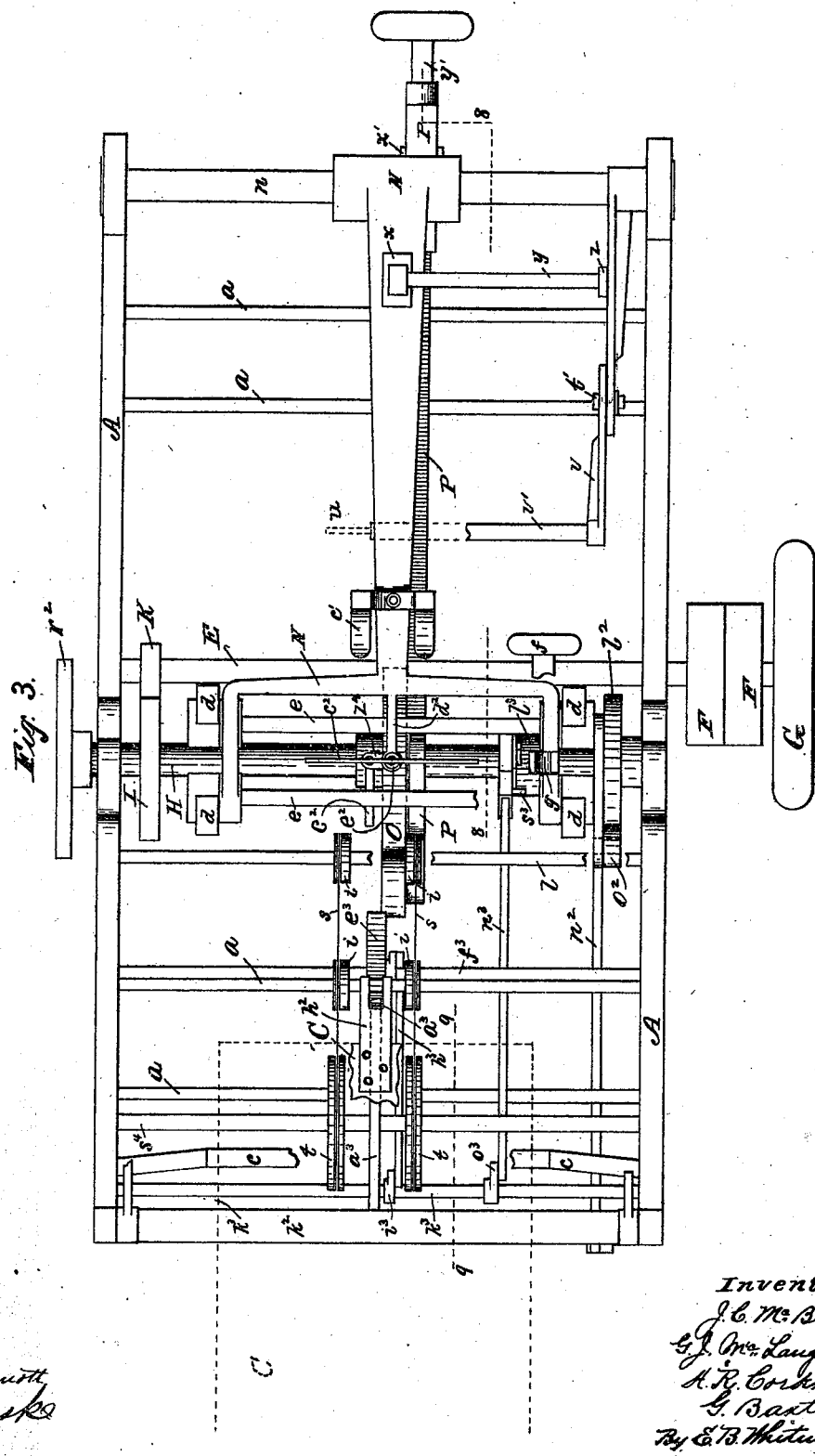

(No Model.) 7 Sheets—Sheet 4.
J. C. McBEAN, G. J. McLAUGHLIN, H. R. CORKHILL, Jr. & G. BAXTER.
LABELING MACHINE.
No. 502,311. Patented Aug. 1, 1893.
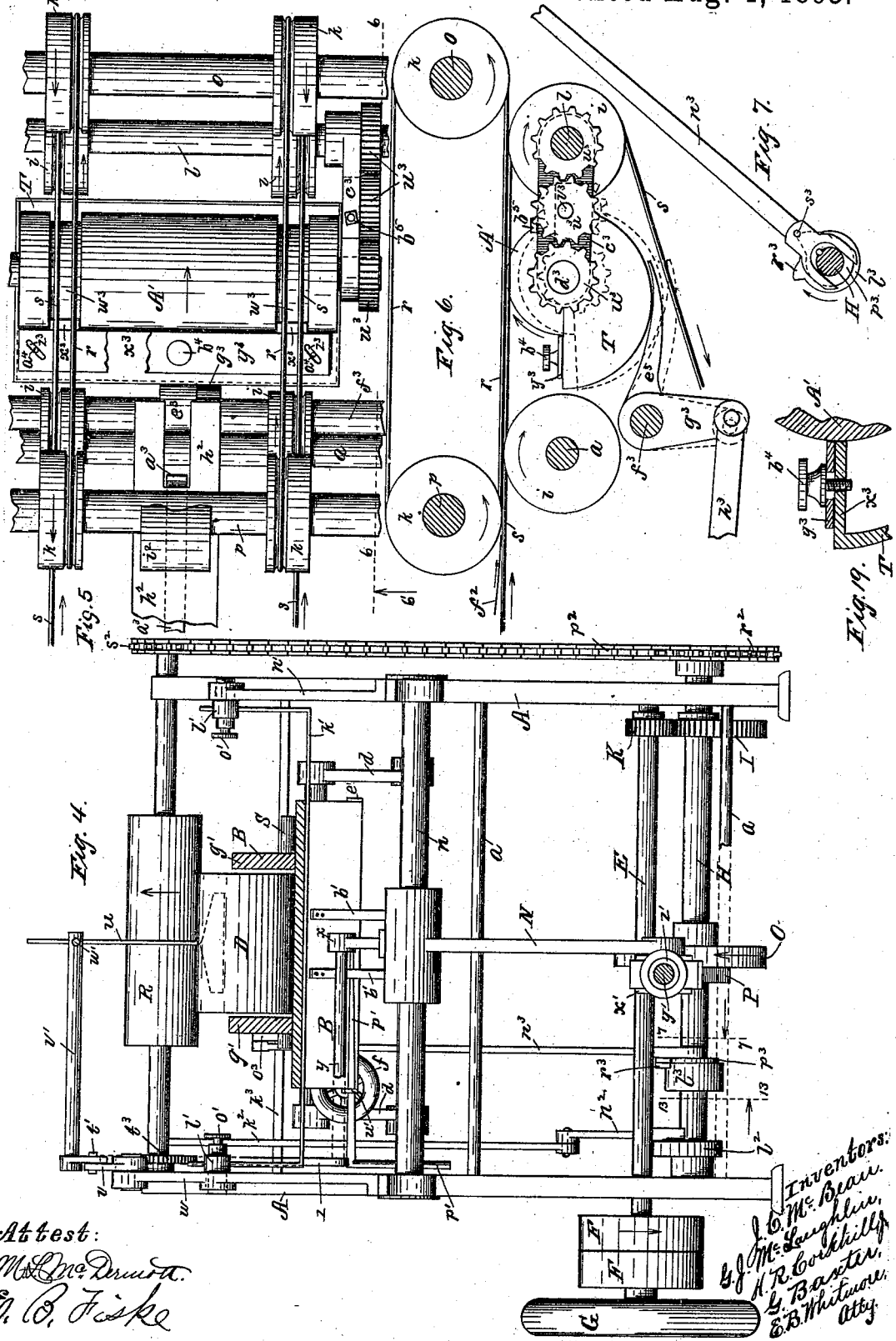

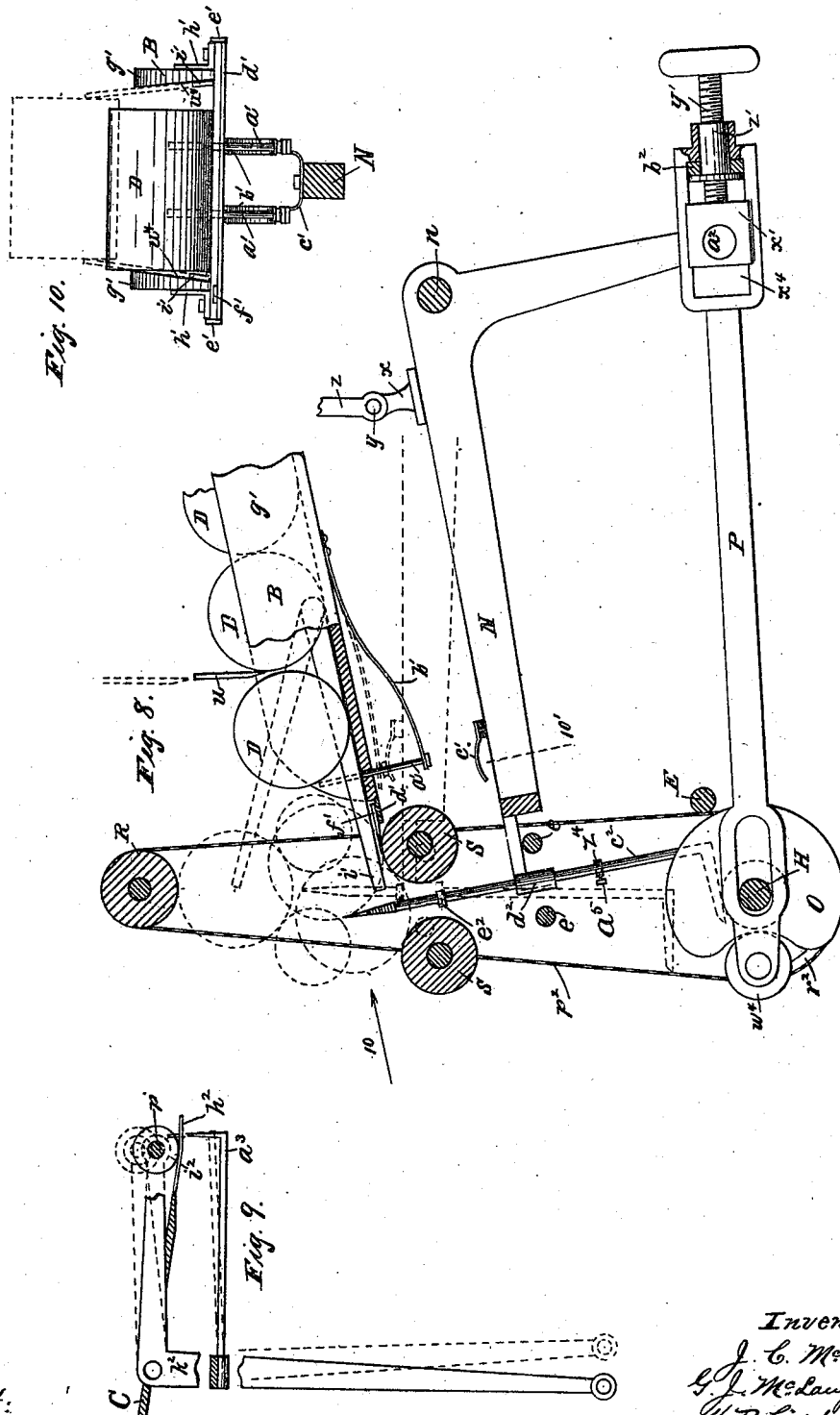

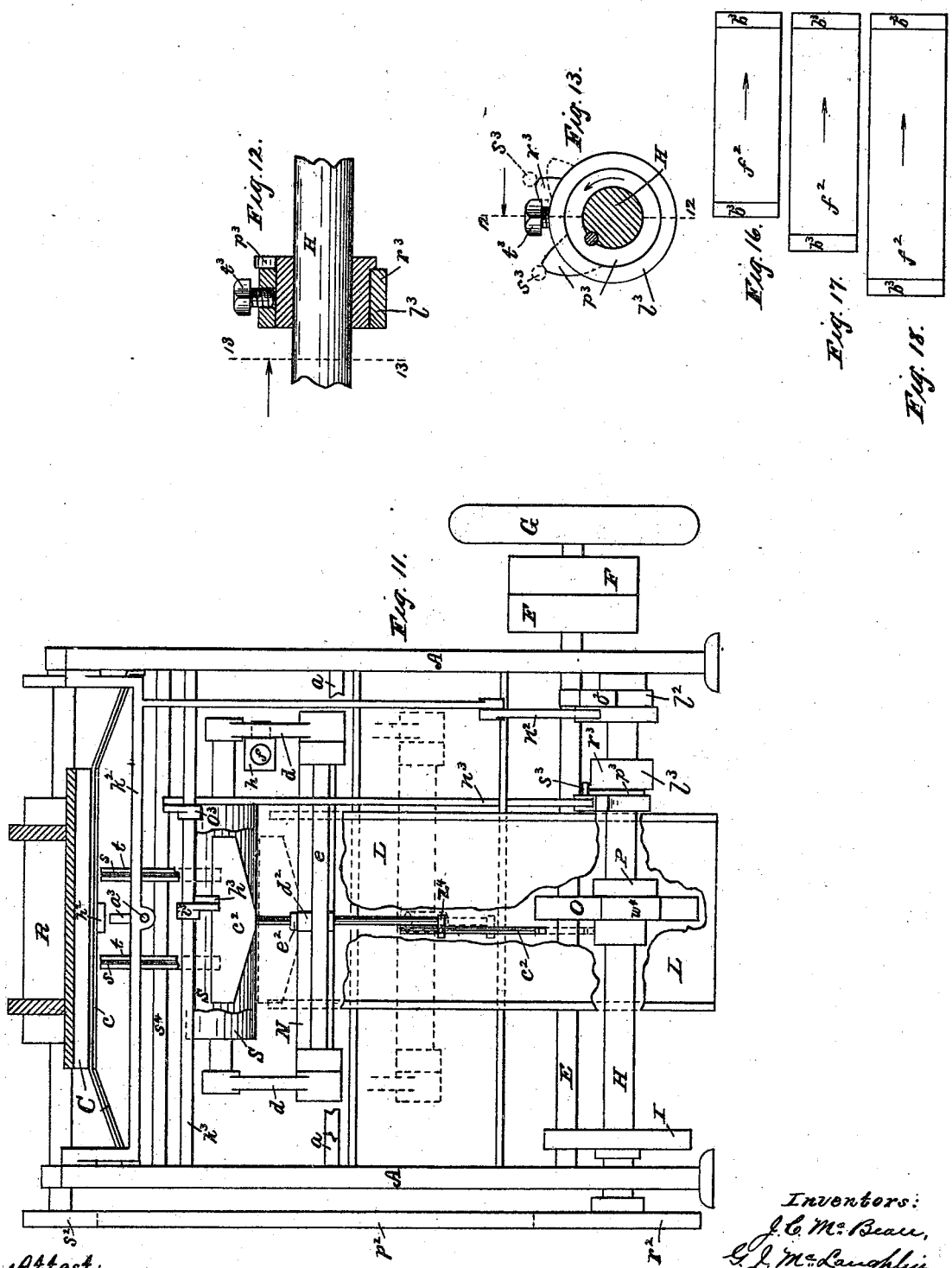

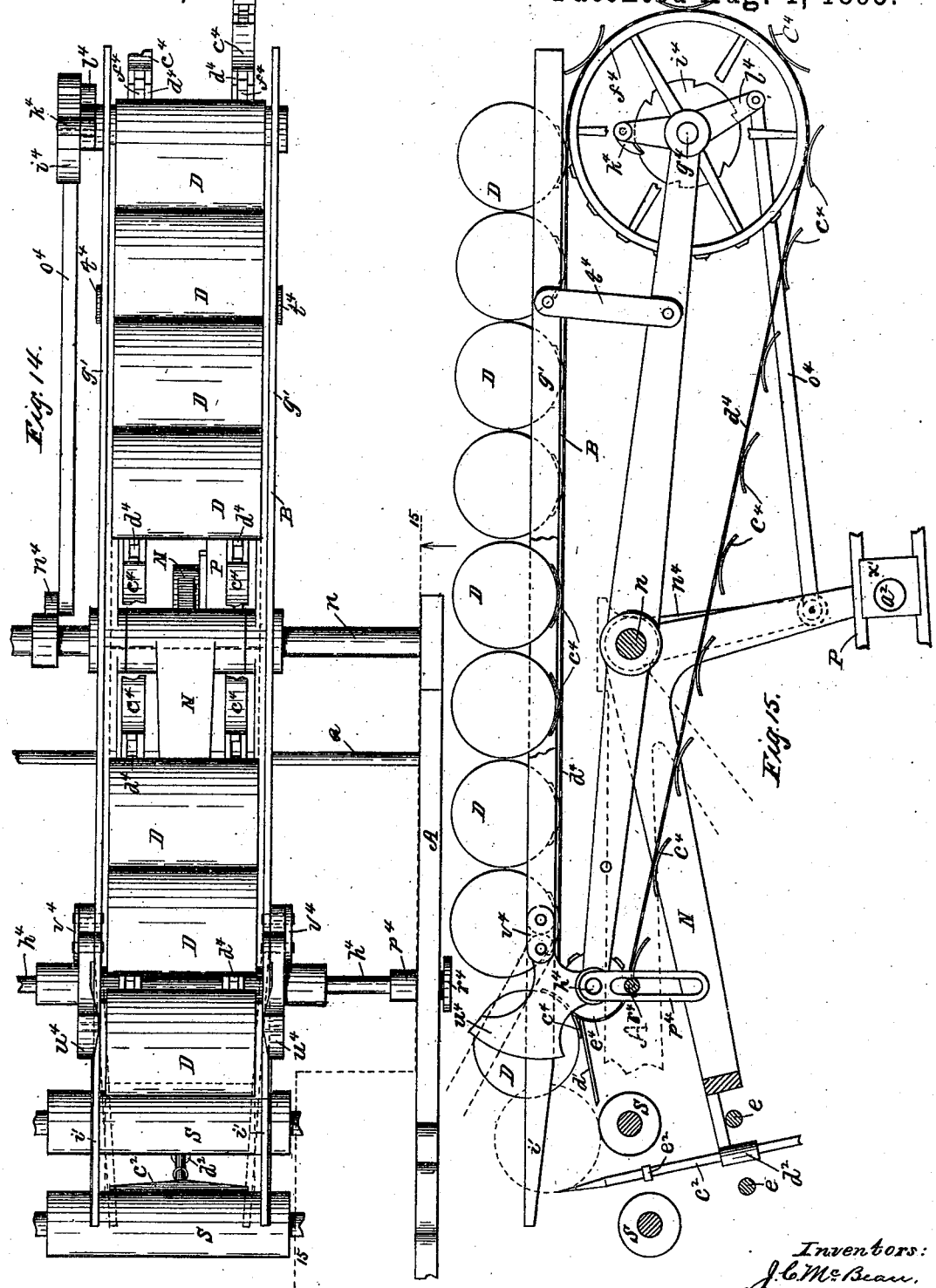

UNITED STATES PATENT OFFICE.

JOHN C. McBEAN, GEORGE J. McLAUGHLIN, HENRY R. CORKHILL, JR., AND GEORGE BAXTER, OF ROCHESTER, NEW YORK.

LABELING-MACHINE.

SPECIFICATION forming part of Letters Patent No. 502,311, dated August 1, 1893.

Application filed February 17, 1892. Serial No. 421,798. (No model.)

*To all whom it may concern:*

Be it known that we, JOHN C. McBEAN, GEORGE J. McLAUGHLIN, HENRY R. CORKHILL, Jr., and GEORGE BAXTER, of Rochester, in the county of Monroe and State of New York, have invented a new and useful Improvement in Labeling-Machines, which is fully set forth in the following specification and shown in the accompanying drawings.

The object of our invention is to improve upon labeling machines now in use by producing a machine that will work more accurately and rapidly and more satisfactorily in certain other respects.

The invention consists in better means for moving and controlling the package to be labeled; in supplying and gumming the labels; in presenting the cans or packages to receive the labels; and in other matters hereinafter mentioned, the parts and devices and the combinations thereof being hereinafter more fully described and particularly pointed out in the claims.

This machine although useful for labeling small packages generally is shown in the figures as operating upon cans only.

Referring to the drawings, Figure 1 is a side elevation of our improved labeling machine, parts being broken away and other parts shown in various positions by full and dotted lines, some minor parts being omitted for the sake of clearness. Fig. 2 is a plan of the machine, parts being broken away to show other parts beneath, some minor parts being omitted. Fig. 3 is a plan showing some of the under parts of the machine that are omitted and obscured in Fig. 2, parts being broken away. Fig. 4 is an end elevation of the machine seen as indicated by arrow 4 in Fig. 1, some of the more distant parts being omitted and the conveyer being transversely sectioned as on the dotted line 4' 4' Fig. 2. Fig. 5 is a plan of the label carrying devices with the paste-pot and adjacent parts, parts being broken away. Fig. 6 is a side elevation of the label carrying devices and the paste-pot with adjacent parts, seen as indicated by arrow 6' in Fig. 5, the shafts being sectioned on the dotted line 6 6, parts being shown in two positions by full and dotted lines. Fig. 7 is a transverse section of the cam shaft taken on the dotted line 7 7 in Fig. 4 and viewed as indicated by the arrow pointed thereon, showing the tilter for the pasting roller. Fig. 8 shows some of the interior parts vertically sectioned on the dotted line 8 8 in Fig. 3, seen as indicated by arrow pointed thereon, parts being shown in various positions the conveyer being in part sectioned as on the dotted line 8' in Fig. 2. Fig. 9 is a side elevation of the rocking bar and stop with adjacent parts, parts being vertically sectioned as on the dotted line 9 9 in Fig. 3. Fig. 10 is an end elevation of the can conveyer seen as indicated by arrow 10 in Fig. 8, parts shown in two positions by full and dotted lines, and the lifter sectioned on the dotted line 10' in Fig. 8. Fig. 11 is an end elevation seen as indicated by arrow 11 in Fig. 1, the feed board being transversely sectioned as on the dotted line 11' in Fig. 1, parts being broken away and other parts shown in two positions by full and dotted lines, certain parts being omitted. Fig. 12 is a longitudinal section of the tilting device for the paste pot taken on the dotted line 12 12 in Fig. 13. Fig. 13 is a transverse section of the cam shaft taken on the dotted line 13 13 in Figs. 4 and 12. Figs. 14 and 15 are respectively a plan and a side elevation of a different form of conveyer for the cans, parts being broken away and omitted, parts in Fig. 15, being vertically sectioned as on the dotted line 15 15 in Fig. 14. Figs. 16, 17 and 18, Sheet 6, show labels of different lengths and widths; and Fig. 19, Sheet 4, is a cross section on the dotted line 19, Fig. 5. Figs. 5, 6, 12, 13 and 19 are drawn to a scale twice the size of that of the main figures; and Figs. 16 to 18 are drawn to a small irregular scale.

Referring to the parts shown A is the frame of the machine, which consists of two similar cast iron sides held rigidly together by cross-girts *a*.

B is the conveyer for the cans D.

C is the feed-board for the labels, secured to the frame by braces *b b* and a cross rest *c*, Figs. 1, 2 and 11.

E is the driving shaft for the machine, provided with tight and loose pulleys F F to receive a driving belt, and an inertia wheel G.

H, Figs. 1, 3 and 4, is a cam shaft provided with a spur gear I, Fig. 2, driven by the shaft E by means of a pinion, K.

L, Figs. 1 and 11, is a discharge chute for the cans or packages after being labeled.

N is a lifting head or lifter for the cans, operated by a cam O on the shaft H.

P is a connecting rod between the cam O and the lifter, Figs. 1, 3 and 8, provided with a roller $w^4$ to traverse the periphery of the cam.

R is a press roller up against which the can is pressed by the lifter while the label is being attached thereto. The lifter is secured to a shaft $n$, which turns in the frame and is provided with rollers S S for the can, parallel and equal in size, between which the can rests, as shown in Figs. 1 and 2. These rollers are held by arms $d$, two at each side of the lifter, said arms being held to turn in vertical planes on bearings $e$ projecting horizontally from the lifter. These carrying rollers are adjustable in a direction toward or from each other by means of an oppositely threaded traverse screw $f$ journaled at $g$ in the lifter and passing through screw nuts $h$ pivoted to the inner faces of two of the arms $d$.

T is the paste pot, Figs. 2, 5 and 6, and A' the pasting roller therein.

$i\ i\ i\ i$ and $k\ k\ k\ k$ are a series of carrying rollers for the labels, held upon horizontal shafts $l$, $a$ and $o\ p$, resting in the frame.

$r\ r$ are endless cords or bands running upon the upper rollers $k$, and $s\ s$ are similar cords or bands running upon the lower rollers $i$. The cords $s\ s$ extend back over grooved idling pulleys $t\ t$, Figs. 1 and 3, held upon a shaft $s^4$, resting in the frame which pulleys are of large diameter to carry said cords clear of the paste pot.

$u$ is a detainer for the cans, used with the gravity conveyer B, shown in Figs. 1, 2 and 8, to prevent more than one can rolling forward upon the carrying rollers S S at once. This detainer is held by an adjustable arm $v$ pivoted at the upper end of a standard $w$ rigid with the frame, as shown, and is caused to move upward and downward by the lifter N by means of a small rigid standard $x$, horizontal shaft $y$, and connecting rod $z$. When the lifter descends by the action of the cam O to its lowest position, (shown in dotted lines in Fig. 1,) to receive a can the detainer $u$ is simultaneously brought down to the position shown in dotted lines in said figure and in full lines in Fig. 8, forward of the can next succeeding the one to be advanced. This serves to hold back all of the cans on the conveyer except the first one. When the first can has rolled to place, by gravity, upon the carrying rollers the cam O raises the lifter and presses said can against the press roller R, as shown in Fig. 1. But when the lifter rises, it will be seen that it also raises the detainer $u$ and liberates the cans in the conveyer. These now roll forward to the extent of the diameter of one can thus presenting another can to roll upon the rollers at the proper time, that is to say, when it again descends to its lowest position. In the meantime the cans are prevented from rolling forward too far by means of stops $a'$ $a'$, Figs. 2, 8 and 10, reaching upward through the floor of the conveyer in position to hold the cans while the detainer $u$ is raised and consequently inactive. These stops are simple rods held at their lower ends by springs $b'$ made rigid with the under surface of the conveyer as shown in Figs. 4 and 8. The normal position of these stops is down as shown in full lines in Figs. 8 and 10, in which their upper ends are even with or below the upper surface of the floor of the conveyer and out of the way of the cans. But when the lifter rises it pushes the stops upward to the position shown in dotted lines, in front of the first can to catch and hold it when released by the detainer $u$.

The lifter is provided with a bifurcated shoe $c'$, Figs. 3 and 8, to encounter the heads of the stops and push them upward against the action of the springs, as shown.

It will be understood that the detainer $u$ and the stops $a'$ alternate in their action upon the cans, the former acting when the lifter is down and the latter acting when it is up.

The conveyer B is provided at its lower end with a pivotal extension piece $d'$, Figs. 2 and 8, to insure a smooth delivery of the cans upon the rollers S. This extension piece is held by clips $e'$, Figs. 2 and 10, rigid with the conveyer so as to turn vertically, and it is provided with a finger $f'$ to reach over upon the nearest roller S, which holds it relatively in position with said roller when a can is about to advance thereon. When the lifter moves upward the roller turns the finger and the extension piece up out of the way; and when the roller descends the extension piece falls to its normal position by gravity. The finger remaining at all times in contact with the roller prevents the extension piece from dropping too far and keeps it in position so that the roller cannot get above it at any time and allow it to fall useless below.

The vertical side pieces $g'$, of the conveyer, Figs. 1 and 2, are laterally adjustable upon the bottom board to provide for cans of different lengths, being secured in place by simple fasteners $h'$. The conveyer is further provided with gravity centering arms or adjusters $i'$ for the cans, at its lower end extending out over the nearest roller S as shown in Figs. 1, 2, 14 and 15, pivoted to inclined bearings $u^4$ on the parts $g'$, (see Fig. 10.) These arms are of such length as to reach by the ends of the can resting upon the rollers S; and as the latter move upward they lift the arms, as shown, the free ends of which, on account of the inclined bearings $u^4$, approach each other as they move upward, clearly shown in Fig. 10. This causes the can to be adjusted longitudinally and presented centrally to the press roller R so that the label shall be pasted centrally thereon.

The conveyer as shown in Figs. 1 and 2 is held to be vertically adjustable by the following means: $k'$, Figs. 2 and 4, is a rod bent at right angles near its ends, upon the horizontal part of which the conveyer rests. The bent ends pass upward through holders $l'$ secured to the standards $w$ and $n'$, and are made fast by clamping screws $o'$. By loosening these clamping screws the rod may be slid upward or downward through the holders to any position desired. At its lower end the conveyer is supported by a bent arm $p'$, Figs. 1, 2 and 4, passing through a clip $u'$ rigid with the conveyer, said arm being secured in a rest $r'$ held in the frame. A clamping screw $s'$ serves to hold the arm in any position of vertical adjustment desired; and the rest being fitted to turn in the frame any desired longitudinal adjustment of the conveyer may be effected. The lower or delivery end of the conveyer is adjusted so as to allow the lower can to roll freely on the rollers S S, as shown in Fig. 8.

The arm $v$ carrying the detainer $u$ for the cans is made in two parts or sections lapping by each other, as shown in Figs. 1 and 2, and rigidly joined by a clamping screw $t'$ passing through a slot $y^4$ in one of said parts. By means of this construction the arm may be lengthened or shortened to adjust the detainer to act upon cans of different diameters. If a series of cans of small diameter, for instance, are being labeled the arm $v$ is lengthened so as to cause the detainer to strike in between the lowest two cans. Or, if cans of large diameter are being put through the machine, the arm is correspondingly shortened. The lower can, without regard to its diameter, advances against the stops $a'$ and the arm $v$ must be adjusted so as to carry the detainer $u$ in immediately back of it and in front of the next one.

The detainer is made vertically adjustable in the part $v'$ that holds it and it is secured to place by a small clamping screw $w'$, Figs. 2 and 4.

In labeling cans of different diameter it occasionally becomes necessary to adjust the rollers S as to the distance between them which is effected by means of the adjusting device $f$ already referred to. The larger the can the greater the distance needs to be between the rollers. It also becomes necessary to regulate the action of the can lifter N for different sized cans, for in each case, the can whether large or small must be pressed against the roller R, while the label is being applied. Or, in other words, the relative portion of space through which the lifter moves must be determined for different sizes of cans, not the distance through which it moves, this being of necessity always uniform on account of the action of the cam O. To effect this change of the relative space through which the lifter acts the outer end of the connecting rod or actuator P is enlarged and formed with an opening $x^4$ and a block $x'$, Figs. 1 and 8, is fitted to slide therein. This block is moved in the opening by means of a longitudinal adjusting screw $y'$, passing through a threaded nut $z'$ held in the extreme end of the rod. A pin $a^2$ of ordinary construction passing through the lower end of the lifter and the block $x'$ connects these two parts. Now it will be understood that by turning the adjusting screw $y'$ to move the block $x'$ to the left, for instance, as shown in Fig. 1, the carrying rollers S S will be caused to approach the press roller R and both extreme points—the upper and the lower—of their motion will be nearer to the roller R. And, on the contrary, by turning the screw in the opposite directions, said carrying rollers will be caused to recede from the roller R, the extreme upper and lower termini of their motions being farther from said roller R. By this means the block $x'$ may be so adjusted that cans of any diameter within limits may be raised just to the roller R and moderately pressed thereagainst for the purpose intended.

It frequently occurs that the cans to be labeled are rough upon their convex surfaces from having been dented, or on account of an occasional drop of solder adhering to them, or from other causes, on account of which it is desirable to have them held against the press roller R by a yielding pressure. This we effect by placing a cushion $b^2$, Fig. 8, of india rubber, metal, or other elastic material between the head of the nut $z'$ and the inner end of the connecting rod or actuator P for the lifter. The nut slides freely through this spring or cushion and through its seat in the rod, by means of which the screws may yield endwise allowing the rollers S S to readily yield slightly downward when an undue pressure is exerted against them in any case, by the can. It is obvious that it is not essential that the cushion be located in this particular place to effect the object sought; for the same thing would be effected by interposing it at any convenient point between the cam O and the roller S, in the parts connecting said cam and rollers.

After a can has received its label it has to be discharged from the rollers S S to make way for another can. Also when a can rolls onto said rollers it needs to have its momentum checked or there would be danger, at times, of the can from its weight (for these cans are filled before they are labeled and are thus rendered quite heavy) rolling across both rollers and so prematurely down the discharge chute L. This will be understood by viewing Fig. 8 which shows said rollers in an inclined position as to a plane tangent with their upper surfaces, when ready to receive a can. These matters of checking the cans as they advance upon the carrying rollers, and of discharging them, are provided for by employing a controlling device $c^2$, Figs. 3, 8 and 11, between the rollers, consisting essentially of a rod or shaft fitted to slide vertically in a rest or bearing $d^2$, in the lifter N. At its upper end the controller for the cans is expanded into a thin broad blade, as shown, the plane of which is parallel with the rollers, and at its lower end it is bent to rest upon the hub of the cam O. This controller is provided with an enlarged part or bead $e^2$ which, coming in contact with the rest $d^2$, limits the downward motion of the controller through said rest. The distance from the bead to the upper edge of the blade is such that when the bead rests upon the bearing $d^2$, said upper edge is considerably below the upper surfaces of the carrying rollers and out of the way of the can thereon, as shown in dotted lines in Fig. 8, and full lines in Figs. 1 and 11. Now, after a can has received its label and the lifter N, begins to descend, the controller moves down with it and does not touch the can until its lower end comes in contact with the hub of the cam O, as shown in Fig. 8. When this occurs its downward motion is arrested (the hub acting as a stop for it) but the lifter with the rollers S S and the incumbent can continues downward which causes the can to encounter the controller and be pushed off the rollers and down the discharge chute L, as indicated. In this capacity the rod or controller acts purely as a discharger for the can. After the lifter has reached its lowest position and the can has been discharged all parts are then in position for another can to advance upon the rollers. And as a new can rolls forward it comes in contact with the rod or controller ($c^2$) as indicated by dotted circle in Fig. 8, which rod now performs the function of a temporary check or arrester for the can. When the lifter now rises the controller does not at first rise with it but remains in contact with the hub of the cam O, from gravity, for a time, which causes it to withdraw between the rollers and allow the can to settle down to place upon both rollers, as shown in Fig. 1. When the lifter rises sufficiently to cause the rest $d^2$ to encounter the bead $e^2$, it carries the controller up with it. The controller is formed in two pieces made to offset one from the other below the rest $d^2$ and joined by a yoke or tie $z^4$, Figs. 3, 8, and 11. The yoke, as a matter of convenience, is secured rigidly to the upper part of the controller and the lower part of the latter is fitted to slide vertically through the yoke and held to place by a binding screw $a^5$. By this means this combined discharger and arrester may have its length (from the upper edge of the blade to the foot or bend) increased or decreased to correspond to the diameter of the cans being labeled. For instance, when the block $x'$ is pushed far to the left in the opening $x^4$ by the adjusting screw $y'$, Fig. 8, to press cans of small diameter against the roller R, the carrying head of the lifter N will not, when at its lowest position, be near the hub of the cam O. On account of this the controller $c^2$ needs to be lengthened at its foot in order to reach the hub of the cam in time to be projected sufficiently far up between the rollers S S, to push the cam off, and also to arrest the on-coming can. Also, when the block $x'$ is far to the right in the opening, for labeling cans of large diameter, and the head of the lifter in consequence swings low and nearer to the cam O, the foot of the controller $c^2$ needs to be shortened. Otherwise it would be projected so far above the rollers S S as to not be withdrawn in time to allow the on-coming can to come to a rest upon the rollers as promptly as it should. The labels $f^2$, are held at the rear of the machine in a feed-board C, Figs. 1 and 2, and fed forward singly by an attendant. These labels are pressed gently against the floor of the feed-board by slender curved springs $g^2$. The feed-board is so adjusted that when a label is advanced beyond its lower end it passes directly under the rear carrying rollers $k\ k$, Figs. 1 and 6, and is caught between the carrying cords $r\ r$ and $s\ s$ and guided and in part propelled by them to the lower part of the press-roller R and upon the can, D.

The feed-board is provided with a tongue $h^2$, Figs. 2, 3, 5, and 9, extending beyond its lower end, immediately over and in contact with which is a revolving friction roller $i^2$, on the shaft $p$. As a label is advanced from the feed-board it is caught primarily by this roller and urged forward to the press roller and can between the cords $r$ and $s$ acting as guides or carriers for the label, as above stated. The shaft $p$ does not rest in the frame but has bearings at the ends of the arms of a rocking bar $k^2$, (see Fig. 11,) by means of which it is caused to alternately rise and fall. By this means the friction roller $i^2$ is, at intervals, lifted from the tongue to allow a label to be passed under it, as stated. The rocking bar is operated by means of a cam $l^2$ on the cam shaft H, shown in Figs. 1, 3, 4 and 11, and a connecting rod $n^2$. The latter piece is expanded at its lower end and bifurcated so as to pass over the shaft H, and is provided with a friction roller $o^2$ to roll upon the periphery of the cam. This cam $l^2$ is formed and relatively timed so as to bring the friction roller $i^2$ down upon the label at the proper time to have it carried onto the can.

The press roller R is revolved by means of a chain $p^2$, Figs. 1, 2, 4 and 11, driven by a sprocket $r^2$ on the shaft H and leading onto a sprocket $s^2$ on the shaft of said roller R. This roller may be of any diameter desired, and made of any suitable material, as metal, wood, india-rubber, &c.; but if made of a hard unyielding substance it is usually blanketed or covered with cloth or other fibrous or yielding material.

The various cord rollers for carrying the labels are revolved as follows: A light spur gear $t^2$, Figs. 1, 2 and 4, is secured to the roller shaft R, just within the frame. This engages a smaller intermediate gear $u^2$ turning on a stud in the frame, which intermediate in turn revolves a gear $v^2$, rigid with the shaft $o$ carrying the forward upper cord rollers $k\ k$. The gear $v^2$ turns an equal gear $w^2$ on the shaft $l$ which carries the lower forward cord rollers $i\ i$. The shaft $o$ is provided with a band pulley $x^2$ and the shaft $p$ is provided with an equal band pulley $y^2$ upon which a band $z^2$ runs to communicate motion to said shaft $p$. The rotation of the forward rollers $i\ i$ turns the large carrying wheels or idlers $t\ t$ by the friction of the cords $s\ s$; and by the same means the rear cord pulleys $i\ i$ are rotated. These latter pulleys are made to turn freely upon the shaft $a$ that passes through them, which shaft does not rotate but is one of the crossgirts above described rigid with the frame.

An intermittingly acting stop $a^3$, Figs. 3, 5 and 9, is provided for the labels as they are advanced singly under the roller $i^2$, as above described. This stop is made rigid with the rocking bar $k^2$ and has its free end bent upward to project above the tongue $h^2$ at proper intervals. It alternates in its action with the friction roller as will be seen from viewing Fig. 9—that is to say, when the friction roller is lifted off the tongue, as already described, to allow a label to be advanced thereunder, the stop is simultaneously and by the same means presented to gage the distance the label is advanced. This stop is shown as projecting upward through an opening in the tongue. This, however, is not essential to the successful operation of the parts for it might project at the end or at one side of the tongue. When the friction roller is brought down upon the label to carry it forward as above described, the stop disappears below the surface of the tongue, its disappearance being slightly in advance of the contact of the roller with the label. When the label is carried forward to the can it passes over a paste pot T and revolves pasting roller A', most clearly shown in Figs. 5 and 6. This pasting roller is arranged to be intermittent in its action upon the label; for usually the latter is not covered with paste over its entire back surface but only upon narrow bands $b^3$ at the ends, as shown in Figs. 16 to 18, Sheet 6. To effect this intermittent action of the pasting device we have made the paste pot pivotal, and so as to be tilted, and provided a tilting device therefor.

$c^3$ Figs. 2, 5 and 6, is a pair of arms on the shaft $l$, the shaft turning freely within them. At their opposite ends their arms hold the trunnions $d^3$ of the pasting roller which is set so that one-half is within the paste pot and one-half above it. The arms are each divided into two parts, as shown in Figs. 5 and 6, and held rigidly together by clamping screws $b^5$, one part of each arm being on the shaft $l$, and the other part secured rigidly to the end of the paste pot. By means of these joints in the arms the paste pot may be at any time readily removed from the machine.

Beneath the paste pot (which as shown is semi-cylindrical) and supporting the latter is a curved finger $e^3$ (see also Figs. 1 and 3) held by a shaft $f^3$ turning in bearings in the frame. This shaft is provided with a crank-arm $g^3$ from which a connecting rod $h^3$ reaches backward to a second crank arm $i^3$ on a shaft $k^3$ also resting in the sides of the frame. (See Fig. 11.) The shaft $k^3$ is slightly rocked or tilted by means of a tilting device $l^3$ on the cam shaft H, Figs. 3, 4, 7 and 11, and a connecting rod $n^3$ reaching from said tilting device to a crank arm $o^3$, rigid with shaft $k^3$.

The tilting device $l^3$, Figs. 12 and 13, is formed in two parts or cams $r^3$ and $p^3$, having projecting points which intermittingly encounter a pin $s^3$ rigid in the rod $n^3$, Figs. 3, 4, 7 and 11. This rod is bifurcated at its lower end and placed over the shaft H; and as the cam-points, on account of the rotation of said shaft, successively encounter the pin the rod is raised longitudinally for a moment at each contact with the pin. Now, it will be seen by observing the parts just described as connecting the tilting device and the paste pot, that when said rod $n^3$ is pushed upward by the cam-points the paste pot will be raised so as to bring the pasting roller in contact with the label passing over it. The cam $p^3$ is made rigid with the shaft H and the cam $r^3$ is fitted to turn upon the cam $p^3$ so that the distance between the projecting cam-points may be adjusted. The cam $r^3$ is provided with a binding screw $t^3$ to secure it rigidly to the inner cam. The cam $p^3$ is so timed that it raises the pasting roller against the advanced end of the passing label, imparting thereto a narrow stripe or band of paste, as shown at $b^3$ at the right hand ends of the labels appearing in Figs. 16 to 18. Immediately after the cam $p^3$ passes the pin $s^3$ the rod $n^3$ with the pasting roller falls from gravity and an intermission of the action of the pasting roller results. When, however, the rear end of the label is just passing over the pasting roller the rear cam $r^3$ comes in contact with the pin $s^3$ and again raises the roller against the label, supplying to it a second stripe of paste $b^3$ at the left hand end of the label as appearing in Figs. 16 to 18.

For short labels the points of the cams have to be placed relatively close together, while for long labels the distance between these points has to be increased. The width of the stripes of paste supplied to the label depends upon the distance across or the length of the points of the cams. If broader bands or stripes of paste are to be put upon the labels the points of these cams must be correspondingly increased in width; and should the whole back surface of the label need to be covered with paste a single broad or continuous point would be required to hold the pasting roller up against the label during the whole time of its passage over the roller. As shown, after each of the cam points passes the pin the paste pot with the pasting roller drops away from the label by gravity into inactivity until the other point is presented to the pin, by rotation. The pasting roller is revolved in the direction in which the label moves by means of a train of gears $w^3$, Figs. 5 and 6, the driving gear of the train being secured rigidly to the shaft $l$ upon which the arms $c^3$ turn. The gear at the left of the train is secured rigidly to the shaft or trunnion $d^3$ of the roller the intermediate gear being held to turn on a stud $v^3$ rigid with the arm.

The pasting roller is formed with depressions $w^3$ under the carrying cords so that the latter shall not touch the roller. This is to prevent the cords becoming smeared with the paste and gumming up the rollers carrying the cords.

The paste pot is provided with a rigid horizontal scraper $x^3$ for the pasting roller and an upper adjustable scraper $y^3$, Figs. 5, 6 and 19. The latter is formed with inclined slots $z^3$ which pass over studs $a^4$ rigid in the scraper $x^3$. By means of these slots and studs a slight longitudinal motion of the adjustable scraper will move it in a direction toward or from the roller to scrape more or less paste therefrom. The adjustable scraper is held to place by a clamping thumb screw $b^4$ passing through it and threaded into the scraper $x^3$. The opening in the adjustable scraper through which the thumb screw passes is larger in diameter than the screw passing through it, which admits of the movements of adjustment of the scraper $y^3$ just above mentioned.

The rigid scraper is formed to have its edge tolerably closely approach the surface of the roller even as to the parts in the grooves $w^3$, it being formed with parts projecting into said grooves. And it serves to prevent any considerable quantities of paste being brought up by the roller, the finer scraping of the roller being effected by the adjustable scraper.

The cord pulleys $k$, $i$ and $t$, Figs. 3, 5 and 6, are grooved to receive the respective cords, while as to the four pulleys $i$ there are no grooves in them under the two cords $r$ $r$, these latter just touching the cylindrical parts of said pulleys $i$, as shown. Furthermore, the grooves in the pulleys $i$ for the cords $s$ $s$ are made of a depth just equal to the diameter of the cords so that the lower surfaces of the lower parts of the cords $r$ $r$ are just level with the upper surfaces of the upper parts of the two cords $s$ $s$. This is clearly shown in Fig. 6. By this means a label, $f^2$, as it advances toward the can is gently pressed between said cords $r$ and $s$ at its two opposite sides. This tends to keep the label straight and causes it to be presented squarely and truly to the can. When the lifter N presses a can against the revolving press roller R as already described, the can is immediately revolved by said roller, from friction, and the can, in turn, revolves the carrying rollers S S, by friction. However, if found necessary, one or both of the rollers S S may also be turned by some simple positive means, applied without further invention. The label is presented between the press roller and the can by the means already described, with the back or pasted side next the can, and is pressed firmly against the latter by the press roller. The can is held against the press roller by the lifter usually while it makes at least one complete revolution; the label being of such length as to completely encircle the convex surface of the can and lap a little at its ends. Should, however, the label be short and sufficient to only partly cover the can the same operation of the parts will properly affix it to the can. And it matters not as to the action of the press roller whether the label is covered with paste all over its back surface or only at the ends, as shown.

The relative arrangement of the carrying rollers S S, and the press roller is such that the former are on opposite sides of, and equidistant from, a plane common to the axes of the press roller and the contiguous can. This will be clearly seen by inspecting Fig. 1, the axes of the three rollers and the can being parallel. Also three lines joining the three axes of the rollers would form a triangle.

The manner of presenting or supplying the cans to the lifter N, to be labeled, is not essential, it only being necessary to deliver them regularly and but one at a time upon the carrying rollers S S. We have employed the gravity supply device or conveyer shown in Figs. 1, 2 and 8, and also an intermittent horizontal conveyer shown in Figs. 14 and 15, preferring this latter method. Either method however, works succeesfully with the other parts of the machine. Both methods are operated automatically by the lifter N or its shaft $n$, the actions of the conveyer, whichever may be used, being timed to deliver a can promply onto the carrying rollers at the proper moment.

In the device shown in Figs. 14 and 15 the cans are placed in small cradles or receptacles $c^4$, of any convenient form, secured to chains $d^4$ running upon sprockets $e^4$ $e^4$ and $f^4$ $f^4$. The sprockets are held by two equal inclined arms B' held to turn upon the shaft $n$, one on either side of the lifter N. At the outer ends of these arms a small horizontal shaft $g^4$ is held which passes through and holds the sprockets $f^4$ $f^4$, and at their inner ends is held a similar shaft $h^4$ for the sprockets $e^4$ $e^4$. The sprockets and chains are given an intermittent motion by means of a ratchet $i^4$, and pawl $k^4$, the latter being secured to a rocking arm $l^4$. The rocking arm is connected with a crank-arm $n^4$, rigid with the shaft $n$, by means of a rod $o^4$. By these means whenever the lifter N moves to bring the carrying rollers S S down to receive a can the pawl is simultaneously caused to advance the chains so as to discharge the foremost can onto said rollers.

The parts are so proportioned that the amount of each forward motion of the chains substantially corresponds with the diameter of a can, or, rather, the distance between the points when two successive cradles are secured to a chain. On this account the uniform advance movements of the chains answer for cans of any diameter that the chains will carry. This conveyer is usually so adjusted that the upper portions of the two chains are about horizontal. This adjustment is made by means of slotted holders $p^4$, one at either end of the shaft $h^4$, these holders being secured to the sides of the frame of the machine by clamping screws $r^4$. By means of the slots in these holders the inner end of the chain carrier may be raised or lowered at pleasure.

The sides $g'$ of the conveyer are held at their outer ends by simple supports $t^4$ rigid with the arms B' and at their inner ends they are secured by means of straps $v^4$ to the inclined bearing pieces or holders $u^4$ for the centering arms $i'$. These bearing pieces or holders, in the form shown in Figs. 14 and 15, are held upon the shaft $h^4$, which turns within them.

What we claim as our invention is—

1. In a machine for labeling packages a press roller, in combination with carrying rollers for the package and supporting arms for the carrying rollers and an adjusting screw for the carrying rollers between the supporting arms, substantially as shown and described.

2. In a machine for labeling packages, the combination, with a vertically movable carrier for the packages, a vertically movable controller for the packages adjacent to the carrier, and a stop for limiting the downward movement of said controller independently of the carrier, substantially as set forth.

3. In combination with the carrying rollers of a labeling machine a lifter to raise and lower the carrying rollers, and a controller for the packages held by the lifter between the carrying rollers and fitted to move in its bearings therein, and a stop for the downward motion of said controller substantially as set forth.

4. In combination with carrying rollers for a labeling machine, a lifter to alternately raise and lower said carrying rollers, a controller held to move independently in bearings in the lifter provided with a bead to be engaged by the lifter in its upward movements, and a stop for the controller in its downward movements, substantially as set forth.

5. An alternately rising and falling lifter of a labeling machine, provided with carrying rollers, in combination with a controller held to slide in bearings in said lifter, and a stop beneath the controller in position to arrest its downward motion while the lifter is yet moving downward whereby said controller is caused to project above said carrying rollers, for the purpose set forth.

6. In a package labeling machine carrying rollers for the package, and a lifter for the carrying rollers, in combination with a controller for the package between the carrying rollers, said controller being adjustable, substantially as described and shown.

7. In a labeling machine, a lifter provided with carrying rollers for the cans, and a movable controller for the can advancing onto said carrying rollers held to move independently in the lifter, and a stop to limit the downward motion of said controller, in combination with a conveyer for supplying cans to said carrying rollers, substantially as shown and described.

8. In a labeling machine, a press roller, and a lifter to move the can toward and from the press roller provided with carrying rollers, and a controller for the can advancing upon said rollers, in combination with a conveyer for supplying cans to said carrying rollers, and means for determining the distance of said carrying rollers below the press roller when the lifter is at the bottom of its stroke, said conveyer being adjustable as to height to bring it to correspond with the carrying rollers when at their lowest position in any given case, substantially as described.

9. In a labeling machine a lifter provided with carrying rollers for the can, and a movable controller for the can advancing onto said carrying rollers, in combination with an intermittingly acting conveyer for supplying cans to said carrying rollers, a stop being provided for the downward motion of the controller, substantially as set forth.

10. In a machine for labeling packages, the combination with a non-yielding pressure roller for applying the labels, a carrier movable toward and from said roller, and an actuator for the carrier, the limit of the movement of which actuator is always the same, and a yielding connection, as a spring buffer, between the actuator and the carrier, substantially as set forth.

11. In a labeling machine, a lifter provided with carrying rollers, in combination with a conveyer for supplying cans to said carrying rollers, said conveyer being provided with movable adjusters for the can, substantially as specified.

12. In a labeling machine a lifter provided with carrying rollers and a press roller, in combination with an actuator for the lifter, and a regulator for the lifter to determine the distance of the lifting rollers from the press roll at the ends of their travel, substantially as set forth.

13. In a machine for labeling packages a feed board for holding the labels provided with a delivering tongue extending beyond its edge, and a revolving friction roller adapted to alternately press and clear said tongue in combination with an intermittingly acting stop for the labels caused to alternately rise above and fall below said tongue, substantially as described.

14. In a machine for labeling packages, the combination with a vertically movable paste pot, of a paste roller journaled therein, having annular depressions in its periphery, feed rollers in front and at the rear of said pot, and cords around said feed rollers and crossing the paste roller at a tangent thereto and through the depressions, substantially as set forth.

15. In a machine for labeling packages, the combination with a substantially semi-cylindrical paste pot one side of which is provided with a rigid top or scraper, of a roller journaled in the open portion of said pot and projecting above the top thereof, and an adjustable scraper secured to the rigid portion of the pot and projecting beyond the inner edge of the same and adapted to bear against the roller, and means for passing the labels above the paste pot, substantially as set forth.

16. In a machine for labeling packages, the combination with a paste pot, one side of which is provided with a rigid top, a roller journaled in the open portion of said pot, and projecting above the top thereof, a pin at each end of said rigid portion, a scraper upon said rigid portion, having slots in its ends for engaging with said pins, a screw for locking said scraper in its adjusted position, and means for passing the labels above the paste pot, substantially as set forth.

In witness whereof we have hereunto set our hands, this 10th day of February, 1892, in the presence of two subscribing witnesses.

JOHN C. McBEAN.
   GEORGE J. McLAUGHLIN.
   HENRY R. CORKHILL, JR.
   GEORGE BAXTER.

Witnesses:
 ENOS B. WHITMORE,
 M. L. McDERMOTT.